May 30, 1939.  M. A. THOMASON  2,160,766
AUTOMATIC PRESSURE CONTROLLED GATE VALVE
Filed April 22, 1937   2 Sheets-Sheet 2
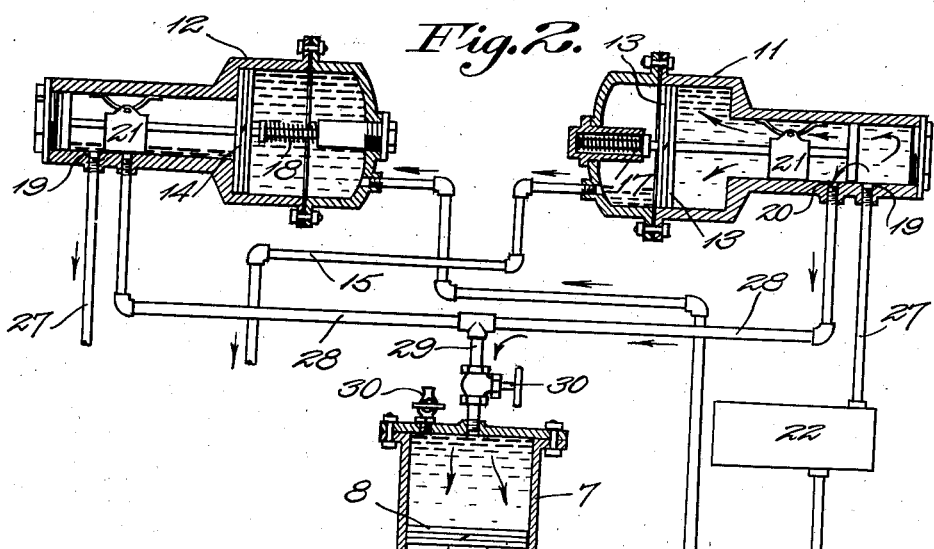
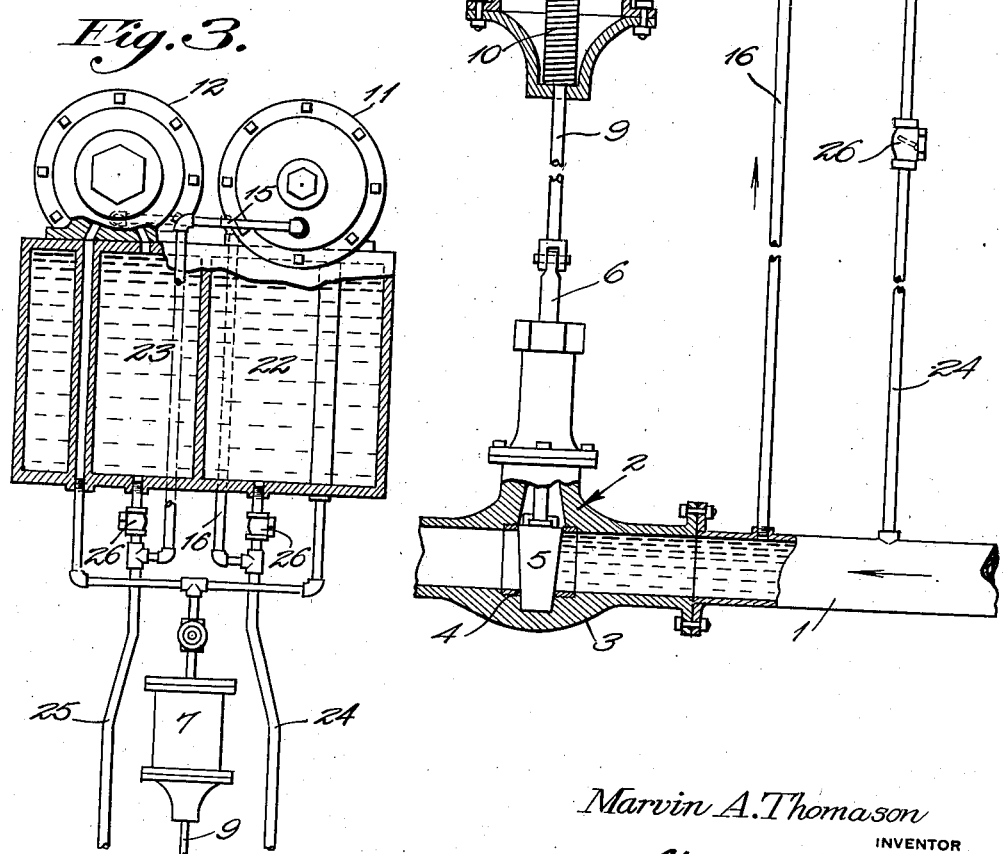
Marvin A. Thomason
INVENTOR Patented May 30, 1939

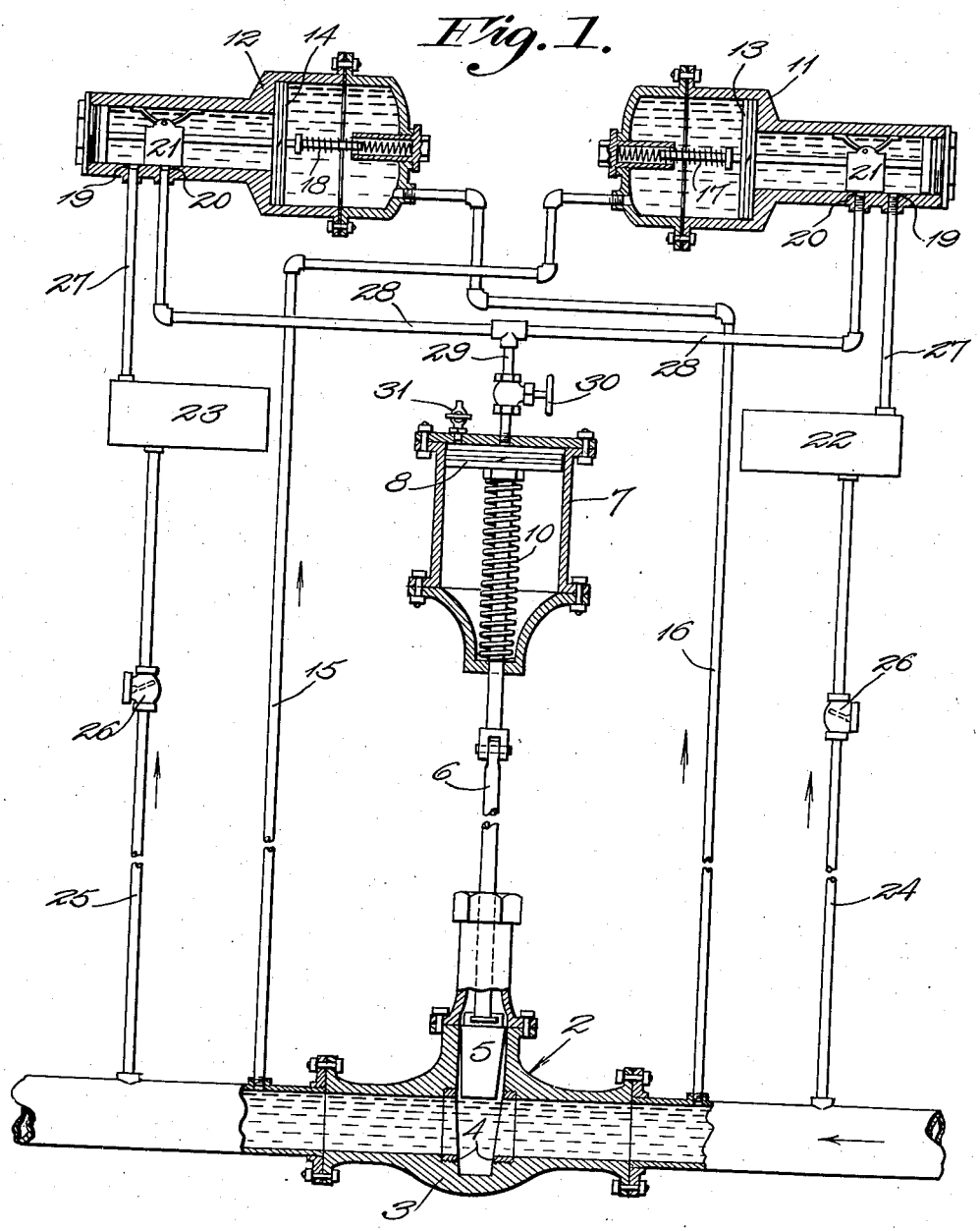

2,160,766

UNITED STATES PATENT OFFICE 2,160,766

AUTOMATIC PRESSURE CONTROLLED GATE VALVE

Mavin A. Thomason, Lake Charles, La.

Application April 22, 1937, Serial No. 138,398

1 Claim. (Cl. 137—153)

This invention relates to automatic pressure controlled gate valves to be employed in fluid pressure pipelines and has for the primary object the provision of a device of this character which will in case of a break in the pipeline automatically close said pipeline between the break and the fluid pressure source to prevent loss of the fluid from said source and which may be easily and quickly restored to normalcy when the break has been repaired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating an automatic pressure controlled gate valve connected in a pipeline and constructed in accordance with my invention.

Figure 2 is a fragmentary vertical sectional view showing pipelines closed by my invention when a break occurs in said pipeline.

Figure 3 is a fragmentary side elevation illustrating a modification of my invention.

Referring in detail to the drawings, the numeral 1 indicates a pipeline in which fluid flows in the direction indicated by the arrow from a source (not shown). This fluid is under pressure. Connected in the pipeline 1 is a gate type valve 2, consisting of a casing 3 having a valve seat 4 and a slidable valve element 5 connected to a valve stem 6. Located adjacent the gate valve is a main pressure cylinder 7 having slidable therein a piston 8, the stem 9 thereof being connected to the stem 6 of the gate valve. A spring 10 acts on the piston 8 to move said piston in a direction for opening the gate valve, thereby rendering the gate valve of a self-opening type which permits the fluid to flow freely through the pipeline 1.

Arranged adjacent the cylinder 7 are cylinders 11 and 12 both of the same construction and have slidable therein pistons 13 and 14. Pipes 15 and 16 connect corresponding ends of the cylinders 11 and 12 to the pipeline 1 at opposite sides of the gate valve. Springs 17 and 18 act on the pistons 13 and 14. These springs may be readily adjusted for increasing and decreasing their actions upon the pistons. The adjustment to the springs can be made in any well known manner. The cylinders 11 and 12 at one side of the pistons thereof are each provided with ports 19 and 20 arranged in close relation to each other. The stems of the pistons 13 and 14 have secured thereto slide valves 21 which during the different positions of said pistons 13 and 14 open and close the ports 20. Reservoirs 22 and 23 are connected to the pipeline 1 by pipes 24 and 25 in which are located check valves 26. The check valves open to admit fluid pressure from the pipeline 1 to said reservoirs and close when the fluid pressure in the pipeline falls below the pressure in the reservoirs. The pipes 24 and 25 connect to the pipeline 1 at opposite sides of the gate valve. The reservoirs 22 and 23 connect to the ports 19 of the cylinders 11 and 12 by pipes 27. The ports 20 of the cylinders 11 and 12 are connected by a pipe 28 which is in turn connected to a branch pipe 29 and the latter is connected to one end of the main pressure cylinder 7. A control valve 30 is located in the branch pipe 29. The end of the cylinder 7 which has the branch pipe 29 connected thereto is provided with a bleed valve 31.

The cylinders 11 and 12 each are composed of sections detachably connected and clamped between said sections is a combined gasket and seat 32. The combined gasket and seat besides establishing leak proof connections between the sections of said cylinders 11 and 12 are engaged by the pistons 13 during the operation of this device to prevent leakage and which will be hereinafter more fully described.

Instead of having the reservoirs 22 and 23, as shown in Figure 1, they may be joined together, as shown in Figure 3, and provide a support for the cylinders 11 and 12. Also the reservoirs, as shown in Figure 3, when joined together are preferably located in close proximity to the cylinder 7 thus rendering this device more compact.

During normal operation of this device, that is, when the fluid is flowing through the pipeline 1 in the direction of the arrow in Figure 1 from a source (not shown) and with the pipeline free of a leak, the fluid pressure of the pipeline enters the cylinders 11 and 12 upon each side of the pistons 13 and 14 by way of the pipes 24, 25, and 27 and the pipes 16 and 15. The fluid pressure on each side of the pistons 13 and 14 is equal, however, the springs 17 and 18 acting on said pistons position them as shown in Figure 1 so that the valves 21 close the ports 20 and thereby prevent the fluid pressure of the pipeline from reaching the cylinder 7 and acting on the piston 8. The piston 8 being spring pressed opens the gate valve. The reservoirs 22 and 23 being connected to the pipes 24 and 25 obtain fluid pressure from the pipeline 1. Should the main line 1 develop a leak to the left of the gate valve 2 in Figure 1 it will bring about the automatic closing of the gate valve so as to cut off the pipeline between the leak and the source. When a leak develops in the pipeline the pressure falls therein which pressure effects the pressure in the pipes 24, 25, 16 and 15. The check valves 26 immediately close trapping the pressure in the reservoirs 22 and 23. The pressure lowering in the pipes 15 and 16 brings about unequalization of pressure on each side of the pistons 13 and 14. Owing to the trapped pressure in the reservoirs 22 and 23 thereof this pressure overcomes the action of the springs 17 and 18 permitting the pistons 13 and 14 to slide moving therewith the valves 21 to open the ports 20. The pressure of the reservoirs 22 and 23 then passes into the cylinder 7 by way of the pipe 28 and branch pipe 29 acting on the piston 8, driving said piston against the action of the spring 10 to seat the valve element 5 of the gate valve thereby closing the pipeline to the leak. The pipeline being now closed to the leak, the pressure therein builds up between the source and the gate valve. This pressure enters the pipes 24 and 16 causing the piston 13 in the cylinder 11 to move to the right in Figure 1 or to assume the position as shown in Figure 2, and the piston 14 of the cylinder 12 to move to the left in Figure 1 or to assume the position, as shown in Figure 2. The pistons 13 and 14 thus positioned bring about opening of the port 20 in the cylinder 11 and closing the port 20 in the cylinder 12. The fluid pressure then enters the pipe 28 from the cylinder 11 and acts directly against the piston 8 to retain the gate valve closed. The piston 13 when moving to the position shown in Figure 2, contacts the combined gasket and seat 32 of the cylinder 11 to prevent leakage while the piston 14 of the cylinder 12 is forced tightly against the shoulder in the cylinder to prevent leakage. When the leak has been repaired and it is desired to restore the flow through the pipeline, the bleed valve 31 is opened and the valve 30 is closed. The pressure is then cut off from the cylinder 7 to the pipeline and the spring 10 returns the piston 8 to its normal position opening the gate valve. As the flow is restored through the pipeline by opening of the gate valve the bleed valve 31 is closed and the valve 30 opened. The pressure in the pipeline then acts to restore the pistons 13 and 14 to their initial position, or as shown in Figure 1. The invention is then ready to automatically close the pipeline when a second leak develops.

Having described the invention, I claim:

In combination with a pipeline for conveying fluid under pressure from a source, a valve connected in said pipeline, pressure actuated means connected to said valve and normally acting to open said valve, cylinders located adjacent said pressure actuated means and having outlet ports connected to said pressure actuated means and provided with inlet ports, reservoirs connected to the inlet ports, pipes connecting the reservoirs to the pipeline, check valves in said pipes, pistons operating in said cylinders, pipes connecting the cylinders to the pipeline whereby pressure in the pipeline may become equal on each side of the pistons, valves connected to the pistons, springs acting on the pistons for normally positioning said pistons to bring about closing of the outlet ports of the cylinders by said valves to normally close the pipeline pressure to the pressure actuating means and adapted to admit pressure from the reservoirs to said pressure actuated means on the pressure in the pipeline decreasing due to leakage.

MAVIN A. THOMASON.